(12) United States Patent
Florez Choque

(10) Patent No.: US 12,423,612 B2
(45) Date of Patent: Sep. 23, 2025

(54) METHODS, MEDIUMS, AND SYSTEMS FOR GENERATING CAUSAL INFERENCE STRUCTURE BETWEEN CONCEPTS HAVING PREDICTIVE CAPABILITIES

(71) Applicant: Capital One Services, LLC, McLean, VA (US)

(72) Inventor: Omar Florez Choque, Oakland, CA (US)

(73) Assignee: Capital One Services, LLC, McLean, VA (US)

( * ) Notice: Subject to any disclaimer, the term of this patent is extended or adjusted under 35 U.S.C. 154(b) by 1181 days.

(21) Appl. No.: 17/226,619

(22) Filed: Apr. 9, 2021

(65) Prior Publication Data

US 2021/0232972 A1 Jul. 29, 2021

Related U.S. Application Data

(63) Continuation of application No. 16/704,567, filed on Dec. 5, 2019, now Pat. No. 10,977,580.

(51) Int. Cl.
*G06N 20/00* (2019.01)
*G06F 16/901* (2019.01)
(Continued)

(52) U.S. Cl.
CPC ......... *G06N 20/00* (2019.01); *G06F 16/9024* (2019.01); *G06N 3/08* (2013.01);
(Continued)

(58) Field of Classification Search
CPC ...... G06F 16/9024; G06N 20/00; G06N 3/08; G10L 15/1815; G10L 15/18; G10L 15/22; G06Q 30/016
See application file for complete search history.

(56) References Cited

U.S. PATENT DOCUMENTS

| 10,528,669 B2 * | 1/2020 | Chatterjee | G10L 25/30 |
| 10,977,580 B1 * | 4/2021 | Florez Choque | G06F 40/35 |
| 2017/0024652 A1 * | 1/2017 | Kipersztok | G06N 7/01 |

FOREIGN PATENT DOCUMENTS

WO  WO-2007147166 A2 * 12/2007 ............... G06N 5/02

OTHER PUBLICATIONS

Eagle, Nathan, Push Singh, and Alex Pentland. "Common sense conversations: understanding casual conversation using a common sense database." Proceedings of the Artificial Intelligence, Information Access, and Mobile Computing Workshop (IJCAI 2003). 2003. (Year: 2003).*

(Continued)

*Primary Examiner* — Randall K. Baldwin
(74) *Attorney, Agent, or Firm* — KDW Firm PLLC

(57) ABSTRACT

A machine learning (ML) system is provided for integrating common sense into the ML system. In contrast to existing machine learning algorithms that search for statistical correlations between concepts, the ML system is configured to learn the semantic relationships or causality between the concepts. This may be accomplished by training an algorithm or data structure to learn similar vector representations of words present in the same context (e.g., that are present together in the same sentence). The resulting AI/ML structure may be used to guide the generation of a causal graph having predictive capabilities. This causal graph may represent semantic relationships and/or causation between concepts, and hence may be employed to introduce a degree of common sense in the machine learning system.

20 Claims, 10 Drawing Sheets

(51) Int. Cl.
*G06N 3/08* (2023.01)
*G10L 15/18* (2013.01)
*G10L 15/22* (2006.01)
*G06Q 30/016* (2023.01)

(52) U.S. Cl.
CPC .......... *G10L 15/1815* (2013.01); *G10L 15/22* (2013.01); *G06Q 30/016* (2013.01)

(56) References Cited

OTHER PUBLICATIONS

Liu, Hugo, and Push Singh. "ConceptNet—a practical commonsense reasoning tool-kit." BT technology journal 22.4 (2004): 211-226. (Year: 2004).*

Liu, Hugo, and Push Singh. "Commonsense reasoning in and over natural language." Knowledge-Based Intelligent Information and Engineering Systems: 8th International Conference, KES 2004, Wellington, New Zealand, Sep. 20-25, 2004, Proceedings, Part III 8. Springer Berlin Heidelberg, 2004. (Year: 2004).*

Chang, Du-Seong, and Key-Sun Choi. "Causal relation extraction using cue phrase and lexical pair probabilities." International Conference on Natural Language Processing. Berlin, Heidelberg: Springer Berlin Heidelberg, 2004. (Year: 2004).*

Espinosa, Jose, and Henry Lieberman. "EventNet: Inferring Temporal Relations Between Commonsense Events." MICAI 2005: Advances in Artificial Intelligence (2005): 61. (Year: 2005).*

Sureka, Ashish, et al. "Generating domain-specific ontology from common-sense semantic network for target specific sentiment analysis." Proceedings of the fifth international conference of the Global WordNet Association. Mumbai, India. 2010. (Year: 2010).*

Roemmele, Melissa, Cosmin Adrian Bejan, and Andrew S. Gordon. "Choice of plausible alternatives: An evaluation of commonsense causal reasoning." 2011 AAAI spring symposium series. 2011. (Year: 2011).*

Luo, Zhiyi, et al. "Commonsense causal reasoning between short texts." Fifteenth international conference on the principles of knowledge representation and reasoning. 2016. (Year: 2016).*

Burgess, Mark. "A spacetime approach to generalized cognitive reasoning in multi-scale learning." arXiv preprint arXiv:1702.04638 (2017). (Year: 2017).*

Burgess, Mark. "Spacetimes with Semantics (III)—The Structure of Functional Knowledge Representation and Artificial Reasoning." arXiv preprint arXiv:1608.02193 v4 (2017). (Year: 2017).*

Florez-Choque, Omar, and Ernesto Cuadros-Vargas. "Improving human computer interaction through spoken natural language." 2007 IEEE Symposium on Computational Intelligence in Image and Signal Processing. IEEE, 2007. (Year: 2007).*

Otter, Daniel W., Julian R. Medina, and Jugal K. Kalita. "A Survey of the Usages of Deep Learning in Natural Language Processing." arXiv preprint arXiv:1807.10854 v2 (Sep. 2019). (Year: 2019).*

Mikolov et al., "Distributed Representations of Words and Phrases and their Compositionality", Oct. 16, 2013 arXiv:1310.4546. https://doi.org/10.48550/arXiv.1310.4546.

* cited by examiner

METHODS, MEDIUMS, AND SYSTEMS FOR GENERATING CAUSAL INFERENCE STRUCTURE BETWEEN CONCEPTS HAVING PREDICTIVE CAPABILITIES

RELATED APPLICATIONS

This application is a continuation of U.S. Pat. No. 10,977,580 B1, titled "METHODS, MEDIUMS, AND SYSTEMS FOR GENERATING CAUSAL INFERENCE STRUCTURE BETWEEN CONCEPTS HAVING PREDICTIVE CAPABILITIES". The contents of the aforementioned application are incorporated herein by reference.

BACKGROUND

Machine learning algorithms may interact with humans, such as when computer-operated bots conduct conversations with users. Although great strides have been made recently in training these algorithms to sound more natural, they still lack the ability to integrate context and common-sense relationships.

SUMMARY

Exemplary embodiments provide methods, mediums, and systems for learning and applying causation.

According to an embodiment, data may be retrieved that includes human-generated information containing a plurality of concepts. The data may include, for example, one or more of videos, web pages, encyclopedias, or news stories. A learned embedding may be built from the retrieved data, where the learned embedding represents relationships between the concepts.

Building the learned embedding may involve generating a hypothesis including an observation concept and one or more cause concepts. The hypothesis may represent a prediction that the observation concept is dependent upon the cause concepts. A probability distribution may be defined, the probability distribution describing a likelihood of observing the observation concept given the plurality of cause concepts. A coefficient may be assigned to each of the cause concepts, where the coefficients are based on an amount of contribution of the cause concept to the observation concept. The process of generating the learned embedding may be performed using an unsupervised learning process, and/or may involve applying an artificial neural network (ANN).

Observation concepts may be programmatically correlated with cause concepts based on the learned embedding. The correlating may involve selecting a predetermined number of strongest relationships based on the coefficients assigned to the cause concepts. Correlating the concepts may involve determining a strength of the correlation, where the strength is represented as a probability that the observation concept is dependent upon the cause concept. The thus-correlated concepts may be used to generate a causal graph. The causal graph may include a plurality of nodes representing concepts, each pair of nodes connected by zero or one edges, where pairs of correlated nodes are connected with edges. The edges of the causal graph may be assigned weights based on the calculated strength of the correlation between the connected nodes.

The causal graph may then be used to perform at least one of guiding a conversation with a user or making a prediction, given an observed concept, as to which cause concepts caused the observed concept.

According to a further embodiment, the causal graph (or another type of data structure) need not be generated and used by the same entity or at the same time. In such an embodiment, a causal inference structure may simply be accessed, where the causal inference structure includes connections between semantically-related words. In one example, words may be considered semantically related when (and only when) the words appear together in more than a predetermined number of instances among the input data. In another example, the words may appear together in fewer than the predetermined number of instances, but may occur in the presence of certain context conditions that strongly suggest that the words are related. The causal inference structure may be built by constructing a learned semantic space that penalizes the learning of connections between pairs of words that are not strongly correlated in an input data set.

The casual inference structure may be built using particular types of input data. For example, the input data set may be user-specific, so that the causal inference structure is personalized to a given user. In another example, the input data set may be specific to a particular user demographic; in this way, the system can use the causal inference structure to determine whether the user is associated with the demographic. In yet another example, the input data may be culture-specific, so that the system can use the causal inference structure to determine whether the user is associated with the culture. In this way, a tool such as a chatbot can be better customized or personalized to people, demographic groups, and cultures.

A first word that is present in the causal inference structure may be received for analysis. A system may output a prediction of one or more causal words that are predicted to contribute to a context associated with the first word.

This prediction may be used to, for example, guide a conversation with a human user. For example, the prediction may be used to select semantically appropriate words in the conversation, and/or may be used to take actions so as to reduce a length of the conversation.

In a further embodiment, structural learning logic may be employed to access data including descriptions of various related ideas. The data may include human-generated information pertaining to the ideas. The data may include audio data, and/or may be particular to a given user.

Relationships among the ideas may be established by determining that two ideas are correlated. Two ideas may be considered correlated, for example, when the two ideas occur together in the presence or absence of particular context conditions. In one example, two ideas may be considered correlated when the two ideas occur together only a limited number of times (e.g., less than a predetermined number of times), but occur together in the presence of the context condition.

A correlation value may be assigned to the correlated ideas, and correlated ideas having the highest correlation values may be selected and identified as being correlated. The relationships may be established using a representation of an artificial neural network configured to be employed to establish the relationships between the ideas.

The established relationships may be used to generate a representation of a graph. The selected correlated ideas may be connected in the representation of the graph.

The exemplary embodiments will next be described in detail with reference to the attached drawings.

DETAILED DESCRIPTION

Figure 1:
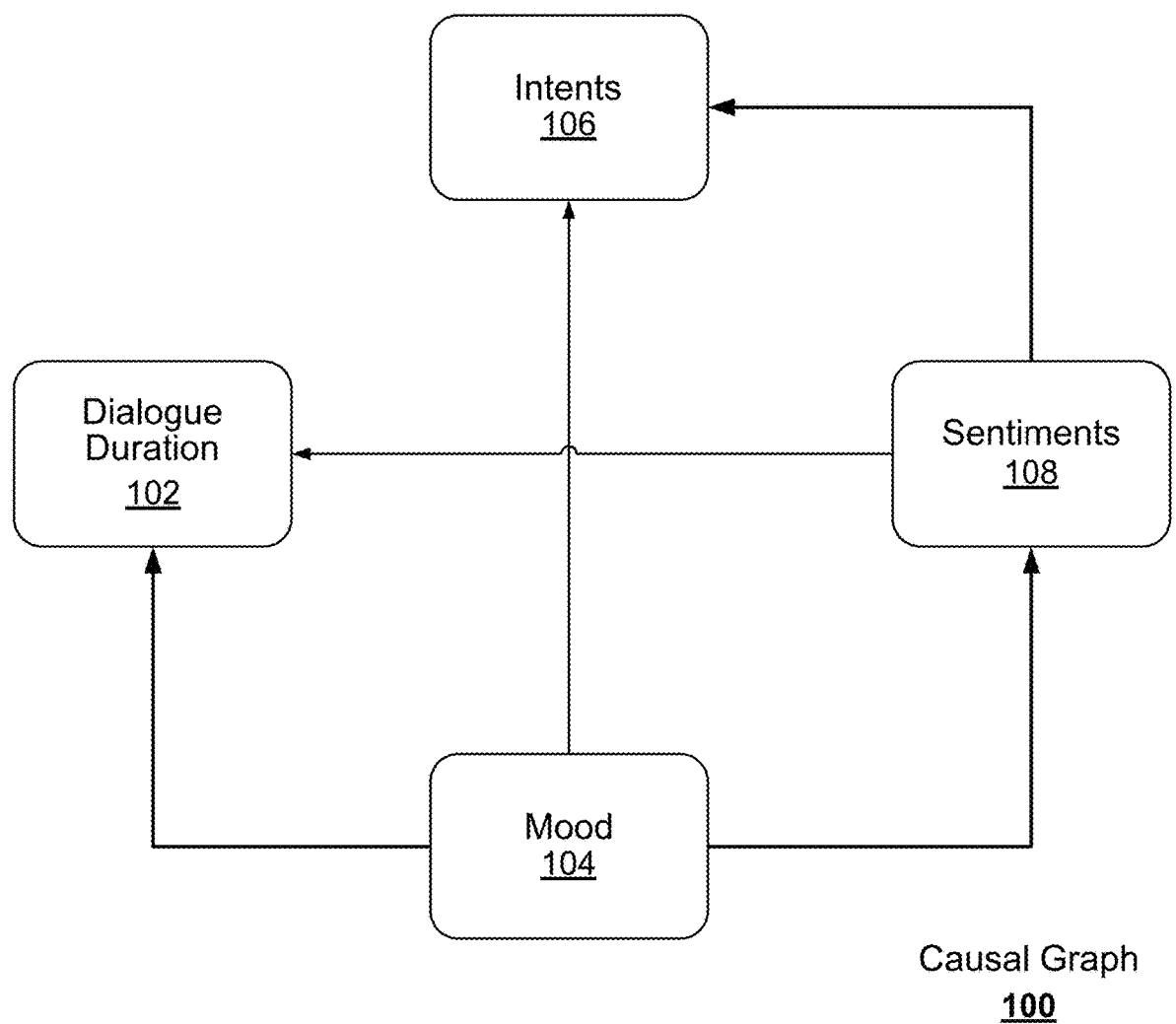
FIG. 1 depicts a causal graph showing dependencies between concepts.

Consider, for example, an artificially-intelligent bot for a banking website that provides customer service to a user. When a user asks for their account balance, the bot could respond in a number of different ways. For instance, if the user has a credit account, checking account, savings account, a mortgage account, and a brokerage account, the bot could break down the user's balance on an account-by-account basis, and could provide even further information (e.g., how much of the brokerage account is dedicated to cash versus stocks and bonds, the value of pending transactions in the credit account, if an automatic payment is scheduled for the mortgage account in the near future, etc.). This information may be of use to a given user, and the user may have even requested the information in the past. However, if it is currently late at night and the user is tired, the user likely wants to receive only the most relevant information (e.g., the top-line numbers for the requested accounts, or only a subset of the accounts that are deemed to be most relevant). Current systems do not have a way to integrate contextual data into a common-sense approach like this one, because they do not have a good understanding of the relationships between the relevant concepts (in this case, the user's current mood and the duration of the dialog).

Some machine learning algorithms have attempted to learn these relationships. However, this learning has generally been based on statistical correlations and has not generally yielded good results. This is because statistical relationships tend to measure correlations between different variables, but not their semantic relationship. Statistical correlations do not necessarily arise because of a true relationship between two concepts (consider the maxim that "correlation does not imply causation"), and so purely statistical approaches can assign a relationship when none exists (or fail to recognize a relationship that does exist).

In some cases, it may be possible to re-introduce an element of common sense into such a machine learning algorithm. Typically, this is done by preparing a set of rules that specifically include or exclude certain conditions (e.g., "if the current time is between 10 PM and 6 AM, use a short dialog" or "exclude race, age, national origin, and gender from decision-making in a loan application"). However, these rules must generally be generated manually and therefore require human supervision and a great deal of effort and trial-and-error. It is, unfortunately, difficult to algorithmically establish these rules, however, since an algorithm based on statistical analysis may learn spurious correlations and therefore introduce algorithmic bias.

In order to address these problems, exemplary embodiments described herein provide techniques for integrating common sense into a machine learning (ML) system. In contrast to existing machine learning algorithms that search for statistical correlations between concepts, exemplary embodiments attempt to learn the semantic relationships or causality between the concepts.

This may be accomplished by training an algorithm or data structure to learn similar vector representations of words present in the same context (e.g., that are present together in the same sentence). One example of such a structure is an artificial neural network. The resulting structure may be used to guide the generation of a causal graph having predictive capabilities.

This causal graph may represent semantic relationships and/or causation between concepts, and hence may be employed to introduce a degree of common sense in the machine learning system. This may be achieved by using the causal relationships, rather than simply statistically-correlated relationships, in applications such as computer-based language processing, machine-learning guided decision-making, and others.

One insight that makes this possible is that a wide array of input data has been generated by humans and is readily available; for example, online encyclopedias, news stories, articles, etc. can be easily farmed for human-generated data. Because humans (theoretically) generate language using a degree of common sense (employing semantically-related words together, and avoiding the use of words that do not make sense together in a given context), this information can be processed to generate the AI/ML structure.

Once the AI/ML structure is generated, it can be used to guide the generation of the causal graph. For example, given that the semantic relationships have been learned and are now encoded in the AI/ML structure, these relationships can be used to connect different concepts together in a graph, and give weight to the connections based on the determined strength of the relationships.

Using the graph, then, one can define groups of closely-related concepts and the relationships between the concepts. This information can help to guide a variety of different services based on semantic causality, rather than statistical correlation. Because of this, conversations may be more natural, accurate, and reflect a degree of human common sense.

There are several design goals that would be desirable to achieve in any suitable solution. First, the solution should provide exceptions to frequent patterns. In other words, the solution should discover and assign higher probabilities to infrequent patterns in user data when relevant context conditions are present. More traditional statistical approaches only optimize for frequent patterns, and therefore miss in-context correlations that do not occur very often.

Second, the solution should be personalizable. Discovered relationships should be tailored to each user of the solution, because each user's own behavior and routine is personal.

Third, the solution should model ambiguity given real-world semantics. The system should discover relationships based, not only on an accurate regression of variables, but also on an evaluation of how semantically valid these relationships are.

The embodiments described herein achieve one or more of these goals, as well as others described below.

As an aid to understanding, a series of examples will first be presented before detailed descriptions of the underlying implementations are described. It is noted that these examples are intended to be illustrative only and that the present invention is not limited to the embodiments shown.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-*a* may include components 122-1, 122-2, 122-3, 122-4, and 122-5. The embodiments are not limited in this context.

FIG. 1 depicts an example of a causal graph 100 showing dependencies between concepts. This particular example is derived from real-life customer conversations with chatbots at a bank. The graph shows complex conditional dependencies between sentiments 108, intents 106, and moods 104, and their relationships to the duration 102 of a dialog with the chatbot. In FIG. 1, the thicker the line connecting two concepts, the stronger their conditional dependence.

The type of graph shown in FIG. 1 is often used in applications in which one is interested in finding correlated variables. In causal graphs 100 generated using traditional technology, an edge will often connect two nodes in a relationship that only expresses a statistical correlation. In fact, current methods favor co-occurring patterns and frequent interactions but, in the experience of the inventors, tend not to discover what would generally be considered common-sense relationships.

In exemplary embodiments of the present invention, edges connect nodes to show a causal and/or semantic correspondence, and the weight of the edge reflects the strength of the correspondence.

Figure 2C:
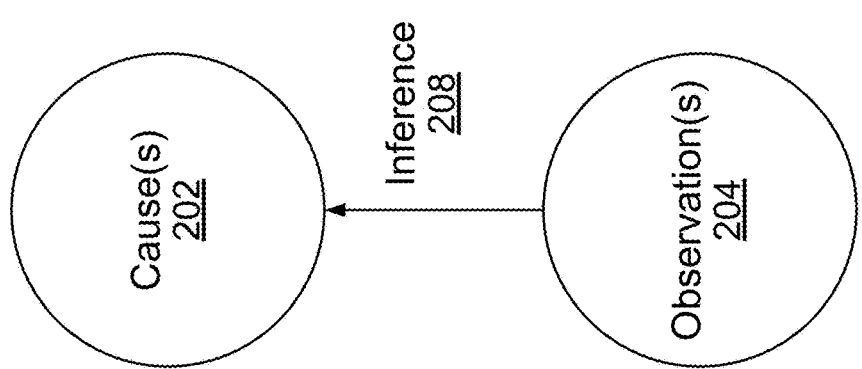
FIG. 2C depicts a causal graph including causes and observations in which the conditional dependencies of FIG. 2B are applied to infer the causes of a given observation.
Figure 2B:
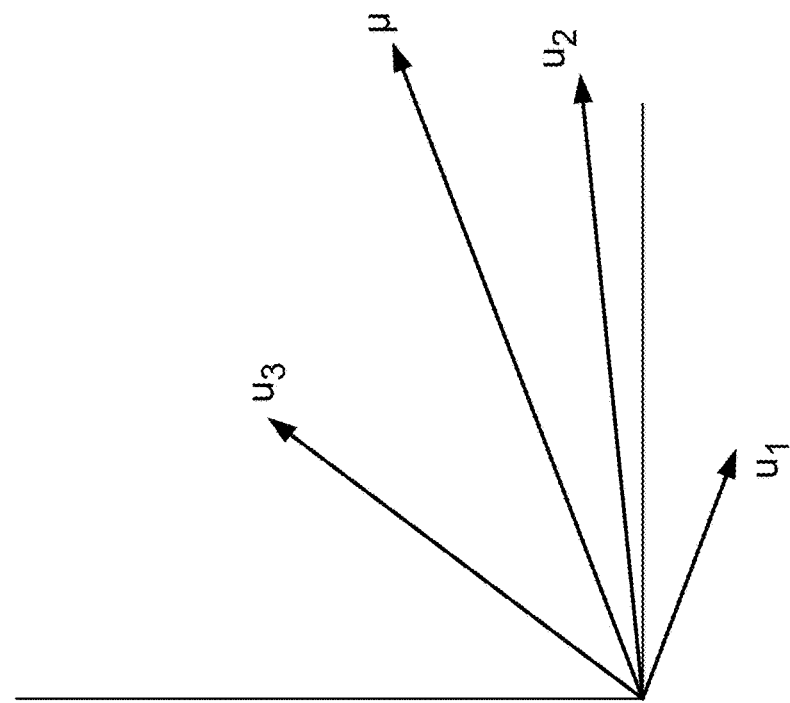
FIG. 2B depicts a computation of a conditional dependency between concepts in the causal graph of FIG. 2A.
Figure 2A:
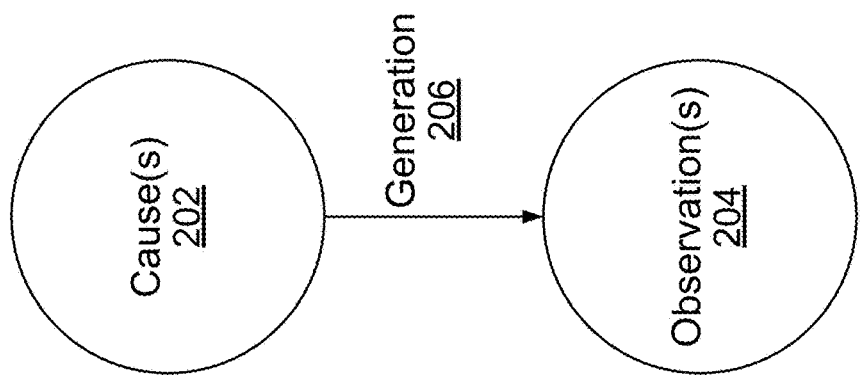
FIG. 2A depicts a causal graph including causes and observations suitable for use in structural learning according to exemplary embodiments.

To better illustrate this point, consider the examples in FIGS. 2A-2C.

FIG. 2A depicts a causal graph including causes and observations suitable for use in structural learning according to exemplary embodiments. In this example, an observer observes one or more observations 204 (where an individual observation may be designated as $\mu$). The observations 204 may have one or more underlying causes 202 which result in the observation $\mu$ (where an individual cause may be designated as r). This process of moving from one or more causes 202 to one or more observations 204 is referred to as generation 206.

In exemplary embodiments, a structural learning process may generate a hypothesis that aims to explain the observation $\mu$ given a set of causes r. The strength of the relationship between the causes r and the observation $\mu$ may be represented as a probability distribution denominated as a likelihood: P(observation|causes).

This probability distribution can be computed using a representation as depicted in FIG. 2B. FIG. 2B shows that the conditional dependence can be modeled with a linear regression process in which a model finds coefficients u that assign importance to each of the N causes r. This linear combination is able to explain or estimate the actual value of the observation $\mu$ with a degree of error $\epsilon$ based on Equation 1 below:

$$\mu = \Sigma_{i=1}^{N} u_i r_i + \epsilon \qquad \text{Eq. 1}$$

Once all the conditional dependencies are computed, the top K relationships may be selected (where K is a predetermined number that may be selected, e.g., based on the application or the number of relationships desired to be defined). These top K relationships may survive to generate a graph of strong dependencies, which is able to implement predictions. A prediction may refer to the ability to infer causes from a given observation in an inference process 208, as shown in FIG. 2C.

Figure 3:
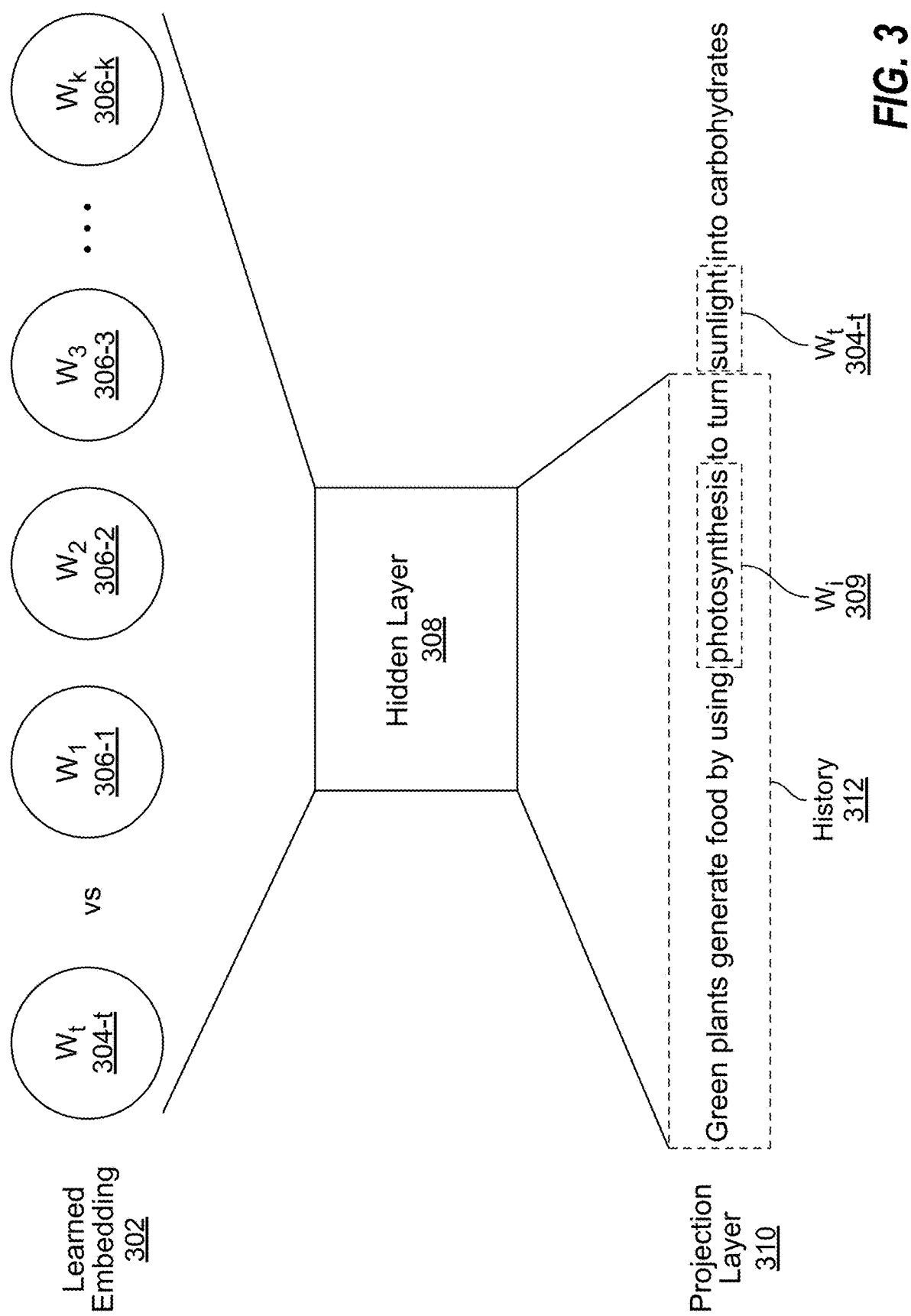
FIG. 3 depicts an exemplary neural network suitable for use with exemplary embodiments.

In order to draw these inferences, a machine learning/artificial intelligence structure such as an artificial neural network (ANN) may be trained. FIG. 3 depicts an exemplary ANN suitable for use with exemplary embodiments.

The learning process is based on the hypothesis that two concepts that tend to occur together in the same sentence (e.g., photosynthesis and sunlight) tend to be highly correlated [Mikolov 2014]. The artificial neural network maps words to latent concepts by learning similar vector representations for the words. These relationships are encoded in hidden layer 308 of the neural network. This embedding is a learned semantic space for leveraging relationships between concepts, and will be used as prior knowledge over relationships when constructing a causal graph to penalize the learning of relationships that lack common sense during the structural learning process. An example of a suitable technique for mapping words to concepts is the unsupervised Word2Vec method.

In the example of FIG. 3, the ANN is trained using textual snippets, such as sentences taken from digital texts (e.g., online articles, publications, encyclopedias, websites, etc.) The textual snippet appears at the bottom of the example as a projection layer 310. As the system parses the snippet, a history 312 is built. The model attempts to predict a next word 304-*t* given the history 312. In this case, the system applies models trained using a binary classification objective to discriminate between the real target word 304-*t* and k imaginary (noise) words 306 including 306-1, 306-2, 306-3 . . . 306-*k*. The result is a learned embedding 302 for each possible word. When two words are highly correlated, such as the word "photosynthesis" 309 and the word "sunlight" 304-*t*, their vectors in the embedding space 302 will also be correlated. For example, words that are correlated may be clustered together in the embedding space, as shown in FIG. 4.

Figure 4:
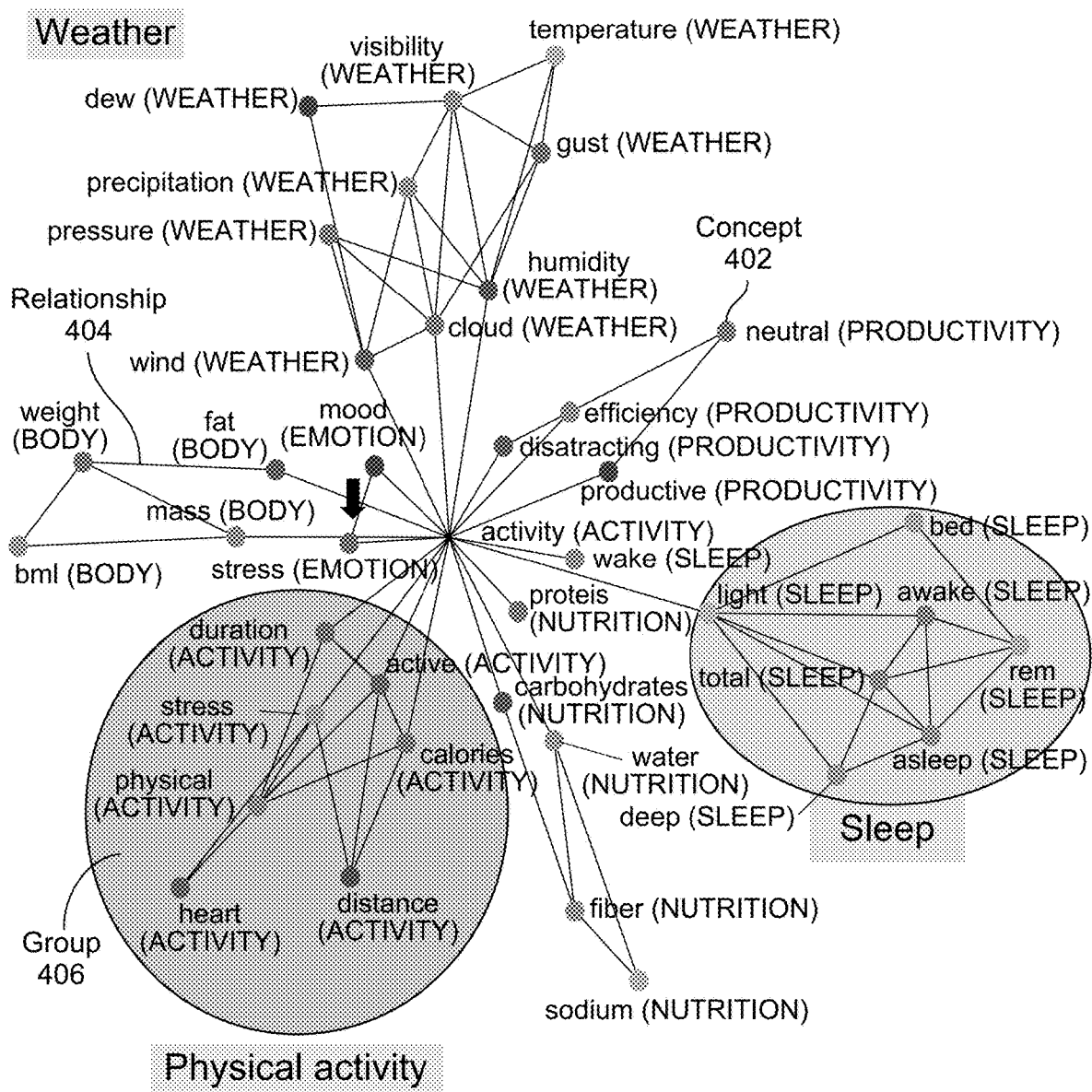
FIG. 4 is an exemplary graph encoding semantic relationships between concepts generated according to an exemplary embodiment.

FIG. 4 is an exemplary causal graph 400 encoding semantic relationships between concepts generated according to an exemplary embodiment. In this example, concepts 402 are represented as nodes in the graph, and each concept 402 is connected by edges representing relationships 404 to other closely related concepts (e.g., the K most-strongly-connected concepts, as discussed above). Multiple concepts that are densely connected and/or otherwise closely related to each other may form groups 406, which may be identified and organized as categories. The groups 406 may similarly exhibit connections to each other representing relationships between groups 406.

The exemplary embodiments may leverage the ANN generated in FIG. 3 to guide the creation of the graph 400 shown in FIG. 4. Concepts that are close together in the embedding space (e.g., "walking" and "running") are mapped together, and those that are less semantically similar (e.g., "sedentary" and "walking") are separated. By establishing relationships between closely related concepts in the embedding space (and using the closeness of those concepts in the embedding space as a proxy for the strength of the relationship), the relationships and groupings in the causal graph of FIG. 4 are better able to capture causal relationships and relationships between words that are semantically connected to each other, rather than simply being statistically correlated.

The result is a semantic causal graph that uses unsupervised data sources and training methods to provide more reasonable causal predictions and explanations. The graph may be used in a variety of contexts, such as a conversational intelligence (e.g., a chatbot) or to predict the cause(s) of a given observation.

It is noted that embedding spaces can be constructed with inputs other than text, and exemplary embodiments may also be directed to such applications. For instance, the above-described methodology could be applied to modalities such as audio (e.g., voice-to-text data).

Figure 5A:
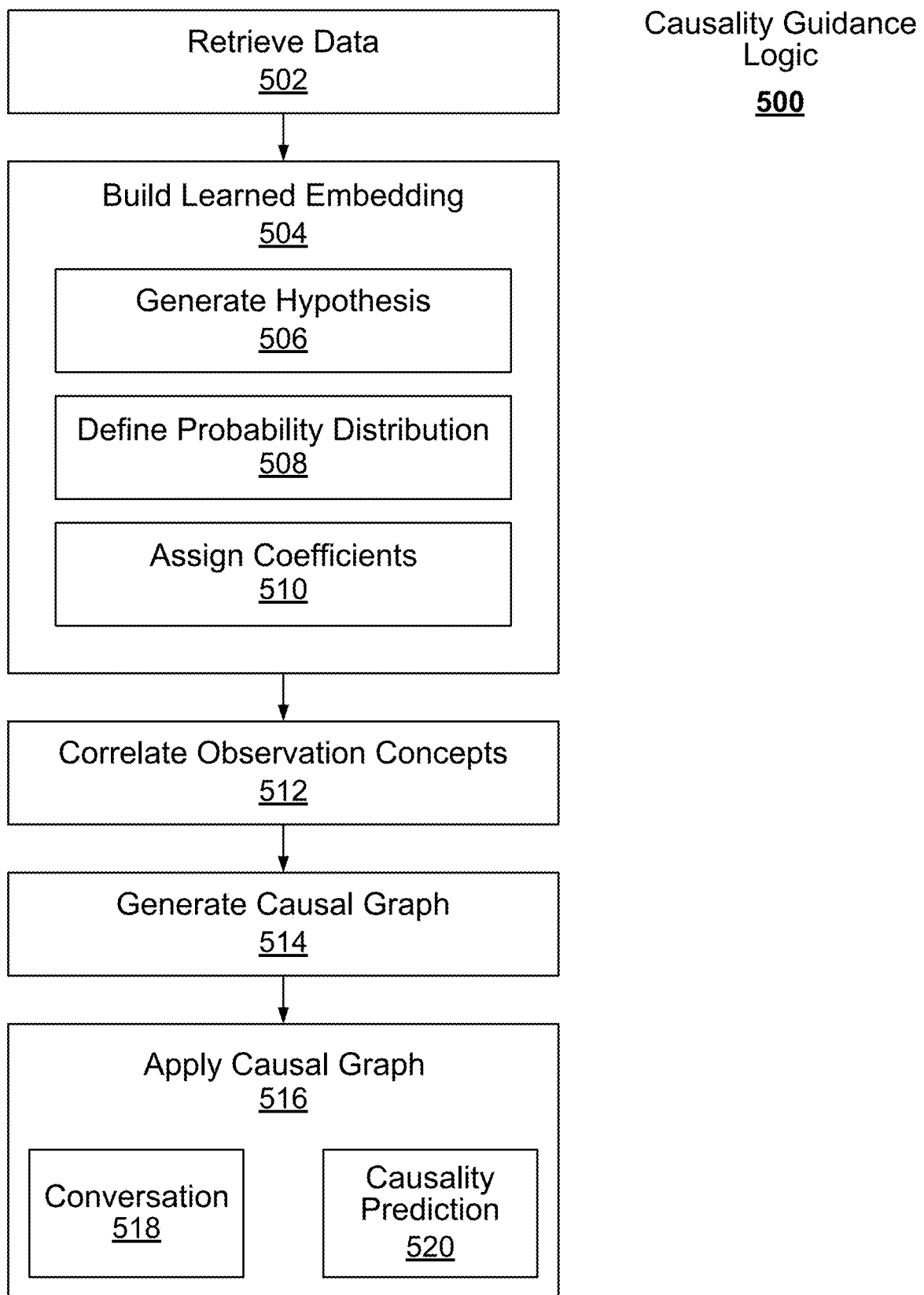
FIGS. 5A-5C are flowcharts depicting exemplary processes for inferring causality according to exemplary embodiments.
Figure 5B:
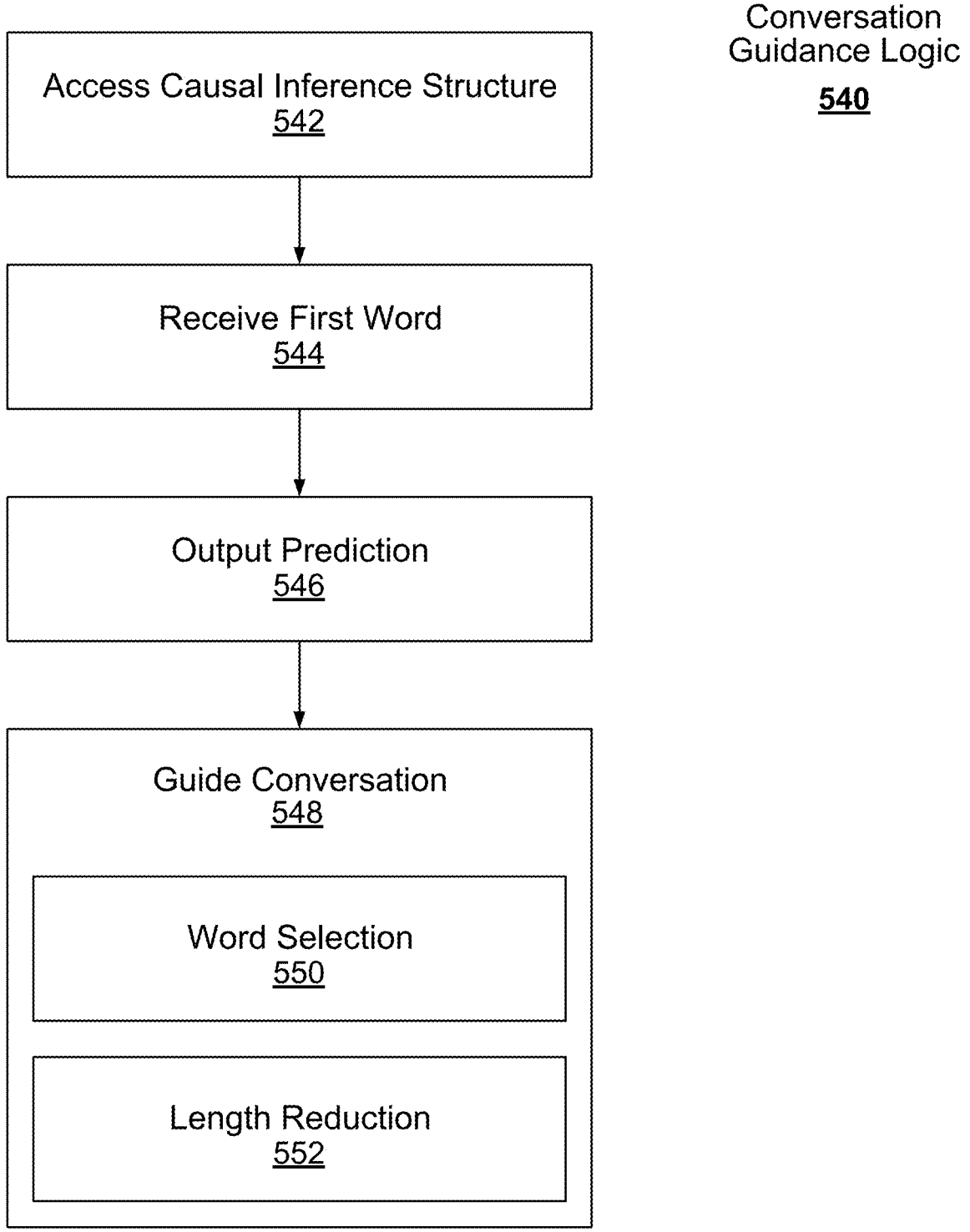

The above-described process is but one exemplary embodiment, with particular steps performed in a particular order. One of ordinary skill in the art will recognize that more, fewer, or different steps may be performed, and the steps may be performed in a different order, while remaining within the scope of the invention. FIGS. 5A-6 depict various embodiments from different perspectives. Unless otherwise noted, it is contemplated that the logic and procedures described in FIGS. 5A-6 may be used in combination with each other and/or in combination with the above-described embodiments.

FIG. 5A is a flowchart depicting logic 500 for performing an exemplary process for generating a causal graph and applying the graph to guide an action based on causality. The logic 500 may be performed by a system, such as by a server for an organization performing the action (e.g., providing a chatbot, predictive intelligence system, etc.), by a client device, or any other suitable device.

At block 502, the system may retrieve data that includes human-generated information containing a plurality of concepts. The data may include, for example, one or more of videos, web pages, encyclopedias, or news stories. The data may be unlabeled data suitable for use in an unsupervised learning process (although, if labeled data is available, it may be used as an alternative or in addition to the unlabeled data).

At block 504, a learned embedding may be built from the retrieved data. The learned embedding may represent relationships between the concepts. This procedure is similar to the one outlined above in connection with FIGS. 2A-2C.

The process of building the learned embedding may involve, at block 506, generating a hypothesis including an observation concept and one or more cause concepts. The hypothesis may represent a prediction that the observation concept is dependent upon the cause concepts.

At block 508, the process of building the learned embedding may further involve defining a probability distribution. The probability distribution may describe a likelihood of observing the observation concept given the plurality of cause concepts.

At block 510, the process of building the learned embedding may further involve assigning coefficients to the cause concepts. The coefficients may be based on an amount of contribution of the cause concept to the observation concept. The process of generating the learned embedding may be performed using an unsupervised learning process, and/or may involve applying an artificial neural network (ANN).

At block 512, observation concepts may be programmatically correlated with cause concepts based on the learned embedding. The correlating may involve selecting a predetermined number of strongest relationships based on the coefficients assigned to the cause concepts. Correlating the concepts may involve determining a strength of the correlation, where the strength is represented as a probability that the observation concept is dependent upon the cause concept.

At block 514, the thus-correlated concepts may be used to generate a causal graph, similar to those shown in FIGS. 1 and 4. The causal graph may include a plurality of nodes representing concepts, each pair of nodes connected by zero or one edges, where pairs of correlated nodes are connected with edges. The edges of the causal graph may be assigned weights based on the calculated strength of the correlation between the connected nodes.

The causal graph may then be applied, in block 516 to perform one of a number of possible tasks. For instance, at block 518, the causal graph may be applied to guide a conversation with a human user. One example of such an application would be using the causal graph with a communications bot (or other similar technology) in order to guide choices that the bot makes, such as choices of vocabulary (e.g., using words that semantically make sense together as defined by their closeness in the causal graph) or taking steps to shorten or otherwise limit the conversation when certain conditions apply (e.g., the user's word choice and surrounding context suggest that the user is tired.

Another example, as set forth in block 520, is to use the causality graph to perform causality prediction. Given an observation embodying one concept, the causality graph may be used to make inferences, as shown in FIG. 2C, as to the causes (which may be represented as other concepts in the causality graph) of that observation. This information may be used to make predictions, guide decision-making, and other activities.

It is not necessary that the graph be generated and applied in a single process; an already-generated graph may be applied in a number of ways, and so the entity that generates the graph may be separated from the entity that uses it. This might allow, for example, for one entity with access to large amounts of data to construct highly accurate and/or customized causal graphs, and to offer the use of the graphs as a service to third parties that use the graphs to guide actions or provide services based on the graph. For example, FIG. 5B depicts a flowchart showing logic 540 for predicting a context relating to one or more causal words, and using the prediction to guide a conversation with a user, based on an existing causal inference structure (such as a causal graph or similar data structure). The logic 540 may be performed, for example, by a system such as a bot server that provides an artificially intelligent conversation service, by a client device, or any other suitable device.

At block 542, the system may access a causal inference structure. The causal inference structure may include a number of words and connections between those words that are semantically related. Words may be considered semantically related when (and only when) the words appear together in more than a predetermined number of instances among the input data. In another example, the words may appear together in fewer than the predetermined number of instances, but may occur in the presence of certain context conditions that strongly suggest that the words are related. The structure may be built by constructing a learned semantic space that penalizes the learning of connections between pairs of words that are not strongly correlated in an input data set, as shown in FIG. 3.

The casual inference structure may be built using particular types of input data. For example, the input data set may be user-specific, so that the causal inference structure is personalized to a given user. In another example, the input data set may be specific to a particular user demographic; in this way, the system can use the causal inference structure to determine whether the user is associated with the demographic. In yet another example, the input data may be culture-specific, so that the system can use the causal inference structure to determine whether the user is associated with the culture. In this way, a tool such as a chatbot can be better customized or personalized to people, demographic groups, and cultures.

At block 544, the system may receive, as an input, a first word that is present in the causal inference structure. At block 546, the system may use the causal inference structure to output a prediction of one or more causal words that are predicted to contribute to a context associated with the first word. These causal words may be identified by following the directed edges in the causal inference structure in the backward direction (from the input first word to related words in the structure).

At block 548 This prediction may be used to, for example, guide a conversation with a human user. For example, the prediction may be used to select semantically appropriate words in the conversation (block 550), and/or may be used to take actions so as to reduce a length of the conversation (block 552).

Figure 5C:
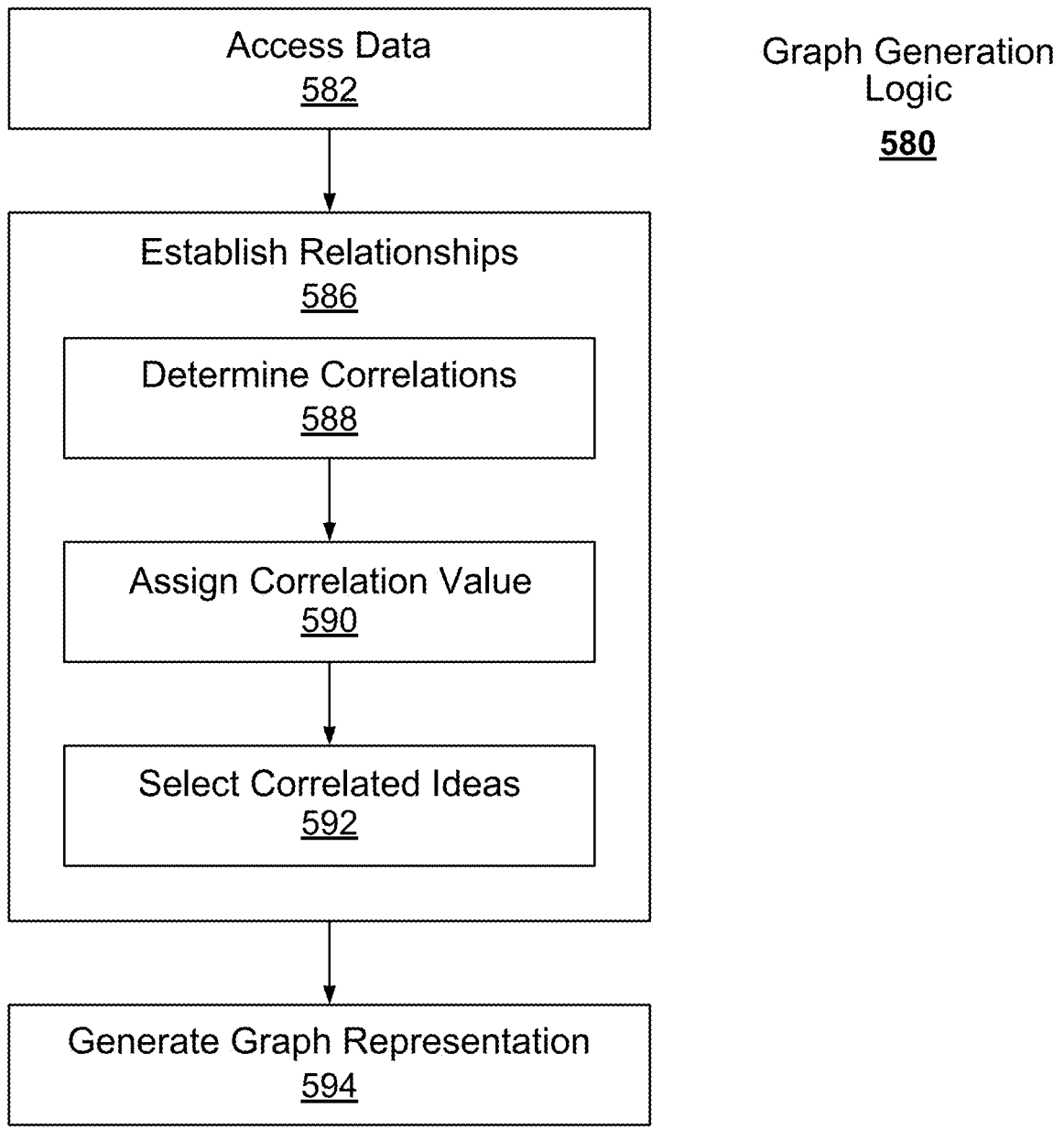
Figure 6:
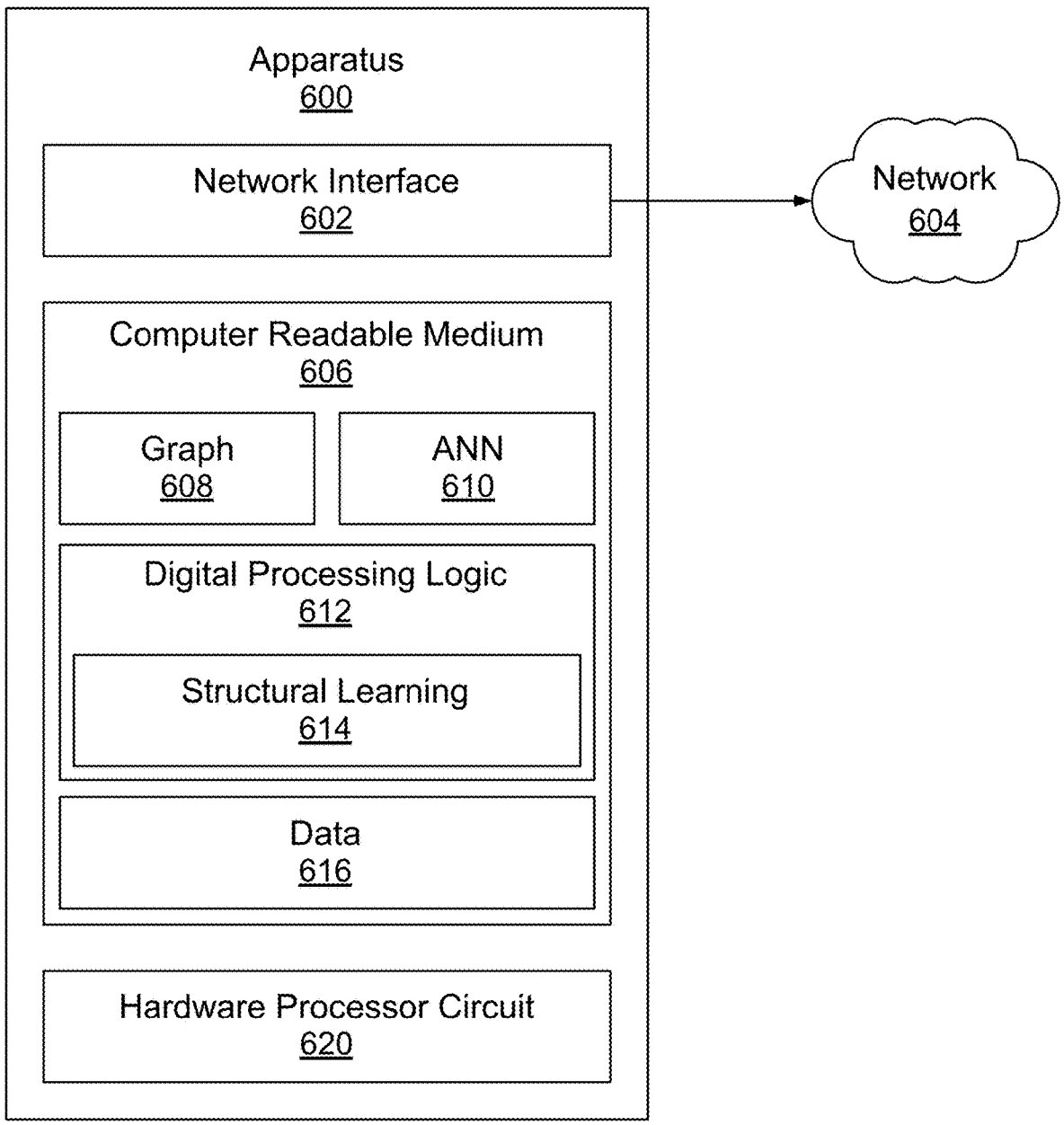
FIG. 6 is a block diagram depicting exemplary apparatuses and data structures suitable for use with an exemplary embodiment.

FIG. 5C is a flowchart depicting logic 500 for performing an exemplary process for generating a graph representation of correlations between concepts. The logic 580 may be performed, for example, by a system such as a server for an organization that uses the graph representation to provide a service, by a third-party server that offers the graph representation itself as a service, by a client device, or any other suitable device.

At block 582, the system may access data including descriptions of various related ideas. The data may include human-generated information pertaining to the ideas. The data may include audio data, and/or may be particular to a given user. If the data includes audio data, then block 582 may involve performing speech-to-text transcription on the audio data to generate a textual representation of the input suitable for use at block 586.

At block 586, relationships among the ideas may be established by determining that two ideas are correlated (block 588). Two ideas may be considered correlated, for example, when the two ideas occur together in the presence or absence of particular context conditions. The context may depend on the application. In another example, two ideas may be considered correlated when the two ideas occur together only a limited number of times (e.g., less than a predetermined number of times), but occur together in the presence of the context condition. For instance, in a system used to guide a conversational chatbot, two words may be considered correlated when they appear together in a transcript of human speech or a dialog (e.g., a messaging conversation), indicating that humans tend to use these words together when conversing. This may be true even when these words do not appear often in other types of written texts, such as journal articles, news stories, etc. In another example, two words may be considered semantically correlated when they appear together when discussing a particular topic; for example, in a typical conversation it may be relatively rare for a person to use the words "mouse" and "wireless" in the same sentence, but this may not be unusual when the context in which the conversation is taking place is centered around a discussion of computer input technology.

In order to establish the relationships, at block 590 a correlation value may be assigned to the correlated ideas, and correlated ideas having the highest correlation values may be selected and identified as being correlated (block 592). The relationships may be established using a representation of an artificial neural network configured to be employed to establish the relationships between the ideas (see FIGS. 2B and 3, above).

At block 594, the established relationships may be used to generate a representation of a graph, such as the causal graph shown in FIGS. 1 and 4. The selected correlated ideas may be connected in the representation of the graph.

FIG. 6 depicts an example of an apparatus 600 suitable to serve as a system for carrying out the logic described in connection with FIG. 5C, as well as FIGS. 5A-5B and the previously-mentioned procedures. For instance, the apparatus 600 may be a chatbot server, a server for providing predictive intelligence services, or a standalone server suitable for generating a causal graph (as described above) and providing inferences from the causal graph as a software service.

The apparatus 600 includes a network interface 602 for receiving input data and/or training data over a network 604 (such as the Internet), and/or for providing an output of the system to a remote recipient over the network 606. The network interface 602 may be or may include hardware, such as a network interface card (NIC).

The apparatus 600 further includes a non-transitory computer readable storage medium 606, which may be a hardware medium such as random access memory, a storage device such as a hard disk drive or solid state drive, etc. The medium 606 may store a variety of data structures configured to be processed and/or executed by a hardware processor circuit 620. For example, the medium 606 may store a graph 608 and an artificial neural network (ANN) 610, such as the causal graph and ANN described above.

Furthermore, the medium 606 may store digital processing logic 612 including instructions configured to be executed by the hardware processor circuit 620. The logic 612 may include structural learning logic 614 suitable for training the ANN 610 and/or constructing the graph 608 based on input data 616. The input data 616 may include data from one or several sources, and may include digital text obtained from the network 604. The text may include, for example, data from a communications service or social network, web pages, journal articles, news stories, etc.

Figure 7:
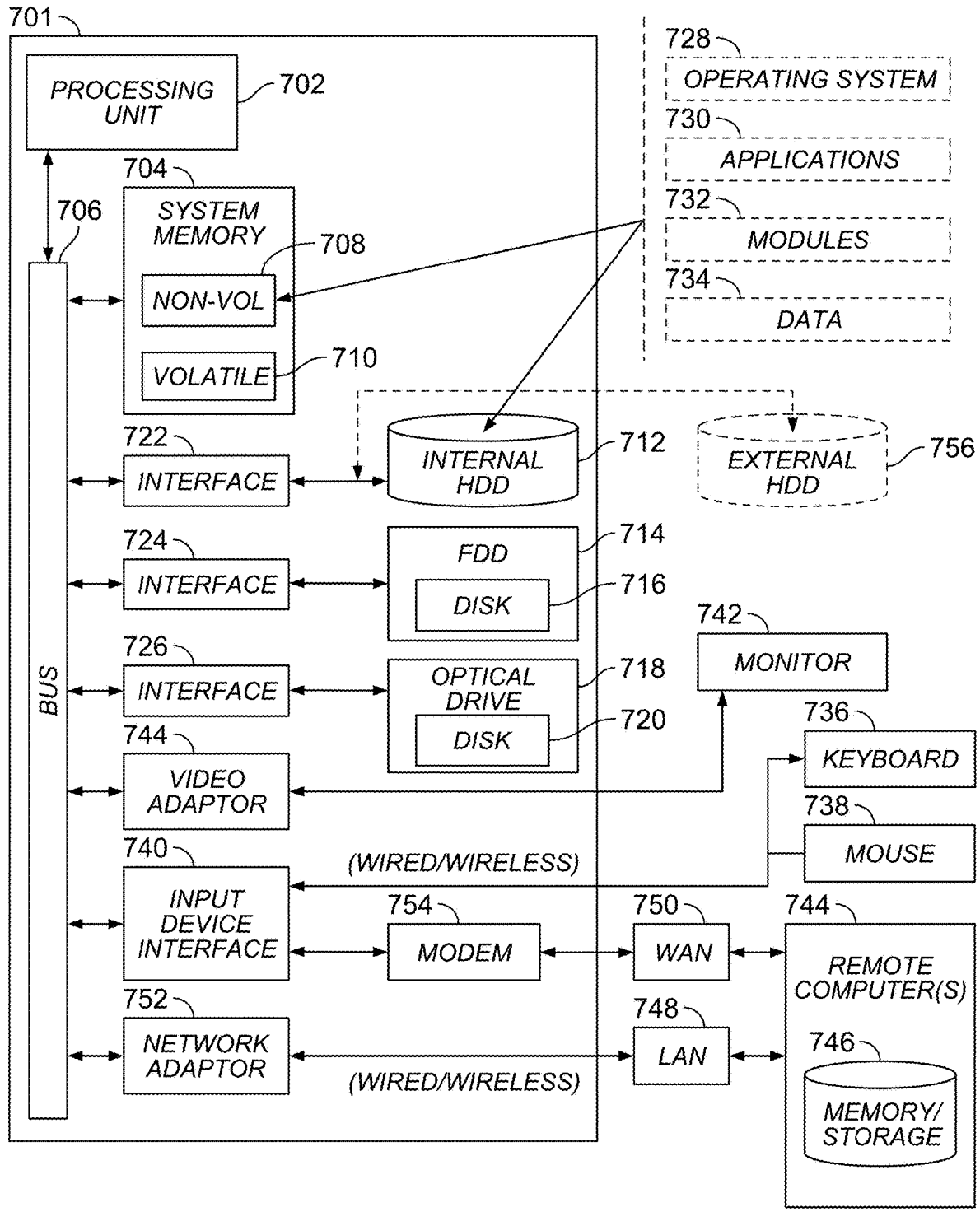
FIG. 7 is a block diagram illustrating an exemplary computing device suitable for use with exemplary embodiments.

The above-described methods may be embodied as instructions on a computer readable medium or as part of a computing architecture. FIG. 7 illustrates an embodiment of an exemplary computing architecture 700 suitable for implementing various embodiments as previously described. In one embodiment, the computing architecture 700 may comprise or be implemented as part of an electronic device, such as a computer 701. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 702, a system memory 704 and a system bus 706. The processing unit 702 can be any of various commercially available processors, including without limitation an AMD® ATHLON®, DURON® and OPTERON® processors; ARM® application, embedded and secure processors; IBM® and MOTOROLA® DRAGONBALL® and POWERPC® processors; IBM and SONY® Cell processors; INTEL® CELERON®, CORE (2) DUO®, ITANIUM®, PENTIUM®, XEON®, and XSCALE® processors; and similar processors. Dual microprocessors, multi-core processors, and other multi-processor architectures may also be employed as the processing unit 702.

The system bus 706 provides an interface for system components including, but not limited to, the system memory 704 to the processing unit 702. The system bus 706 can be any of several types of bus structure that may further interconnect to a memory bus (with or without a memory controller), a peripheral bus, and a local bus using any of a variety of commercially available bus architectures. Interface adapters may connect to the system bus 706 via a slot architecture. Example slot architectures may include without limitation Accelerated Graphics Port (AGP), Card Bus, (Extended) Industry Standard Architecture ((E) ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 704 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 704 can include non-volatile memory 708 and/or volatile memory 710. A basic input/output system (BIOS) can be stored in the non-volatile memory 708.

The computing architecture 700 may include various types of computer-readable storage media in the form of one or more lower speed memory units, including an internal (or external) hard disk drive (HDD) 712, 756, a magnetic floppy disk drive (FDD) 714 to read from or write to a removable magnetic disk 716, and an optical disk drive 718 to read from or write to a removable optical disk 720 (e.g., a CD-ROM or DVD). The HDD 712, FDD 714 and optical disk drive 720 can be connected to the system bus 706 by an HDD interface 722, an FDD interface 724 and an optical drive interface 726, respectively. The HDD interface 722 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 708, 712, including an operating system 728, one or more application programs 730, other program modules 732, and program data 734. In one embodiment, the one or more application programs 730, other program modules 732, and program data 734 can include, for example, the various applications and/or components of the messaging system 500.

A user can enter commands and information into the computer 701 through one or more wire/wireless input devices, for example, a keyboard 736 and a pointing device, such as a mouse 738. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 702 through an input device interface 740 that is coupled to the system bus 706, but can be connected by other interfaces such as a parallel port, IEEE 694 serial port, a game port, a USB port, an IR interface, and so forth.

A monitor 742 or other type of display device is also connected to the system bus 706 via an interface, such as a video adaptor 704. The monitor 742 may be internal or external to the computer 701. In addition to the monitor 742, a computer typically includes other peripheral output devices, such as speakers, printers, and so forth.

The computer 701 may operate in a networked environment using logical connections via wire and/or wireless communications to one or more remote computers, such as a remote computer 744. The remote computer 744 can be a workstation, a server computer, a router, a personal computer, portable computer, microprocessor-based entertainment appliance, a peer device or other common network node, and typically includes many or all of the elements described relative to the computer 701, although, for purposes of brevity, only a memory/storage device 746 is illustrated. The logical connections depicted include wire/wireless connectivity to a local area network (LAN) 748 and/or larger networks, for example, a wide area network (WAN) 750. Such LAN and WAN networking environments are commonplace in offices and companies, and facilitate enterprise-wide computer networks, such as intranets, all of which may connect to a global communications network, for example, the Internet.

When used in a LAN networking environment, the computer 701 is connected to the LAN 748 through a wire and/or wireless communication network interface or adaptor 752. The adaptor 752 can facilitate wire and/or wireless communications to the LAN 748, which may also include a wireless access point disposed thereon for communicating with the wireless functionality of the adaptor 752.

When used in a WAN networking environment, the computer 701 can include a modem 754, or is connected to a communications server on the WAN 750, or has other means for establishing communications over the WAN 750, such as by way of the Internet. The modem 754, which can be internal or external and a wire and/or wireless device, connects to the system bus 706 via the input device interface 740. In a networked environment, program modules depicted relative to the computer 701, or portions thereof, can be stored in the remote memory/storage device 746. It will be appreciated that the network connections shown are exemplary and other means of establishing a communications link between the computers can be used.

The computer 701 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
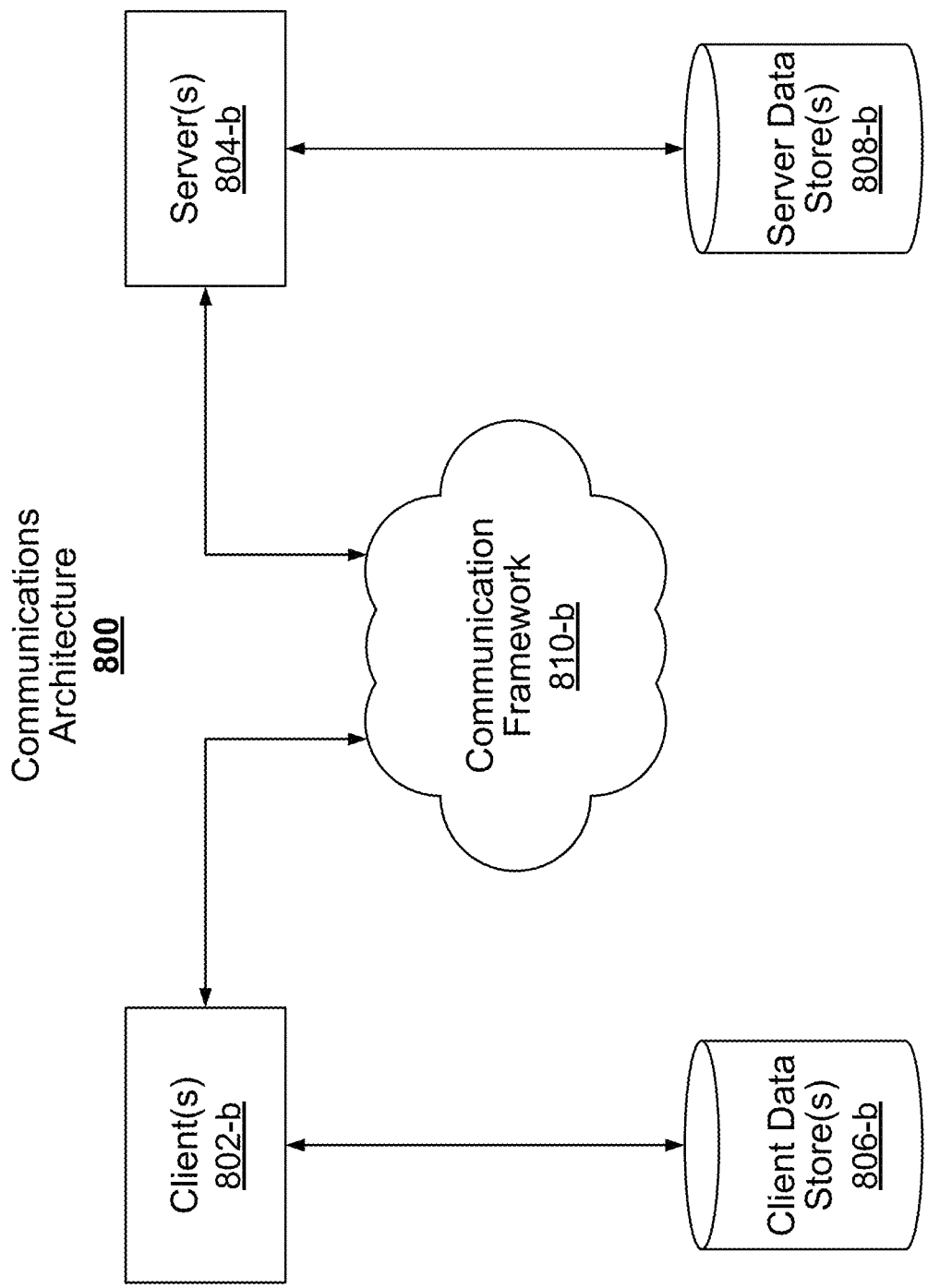
FIG. 8 depicts an exemplary communication architecture.

FIG. 8 is a block diagram depicting an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802-*b* and servers 804-*b*. The clients 802-*b* may implement the client device described above. The servers 804-*b* may implement the server device descried above. The clients 802-*b* and the servers 804-*b* are operatively connected to one or more respective client data stores 806-*b* and server data stores 808-*b* that can be employed to store information local to the respective clients 802-*b* and servers 804-*b*, such as cookies and/or associated contextual information.

The clients 802-*b* and the servers 804-*b* may communicate information between each other using a communication framework 810-*b*. The communications framework 810-*b* may implement any well-known communications techniques and protocols. The communications framework 810-*b* may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810-*b* may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.8a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802-*b* and the servers 804-*b*. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
a processor; and
a memory comprising instructions that when executed by the processor cause the processor to:
analyze textual input data to determine a causal relationship between a first word in the textual input data and a second word in the textual input data based on semantics of the textual input data, wherein determining the causal relationship comprises mapping the first word to a first concept using an unsupervised artificial neural network by learning a first vector representation for the first word; mapping the second word to a second concept using the unsupervised artificial neural network by learning a second vector representation for the second word; generating a hypothesis comprising the first concept and the second concept, the hypothesis representing a prediction that the first concept is dependent upon the second concept; defining a probability distribution describing a likelihood of observing the first concept given the second concept; and assigning a coefficient to the second concept based on an amount of contribution of the second concept to the first concept, the coefficient for the second concept comprising a vector in a semantic space;

determine a weight for a connection in a causal inference structure, the connection between the first and second words in the textual input data based on the causal relationship determined between the first and second words; and generate the causal inference structure comprising the first word, the second word, and the connection with the weight between the first and second words.

2. The apparatus of claim 1, the memory comprising instructions that when executed by the processor cause the processor to identify a semantic relationship between the first and second words in the textual input data to determine the causal relationship between the first and second words.

3. The apparatus of claim 2, wherein the semantic relationship comprises a frequency with which the first and second words are present in a same sentence of the textual input data.

4. The apparatus of claim 2, wherein the weight of the connection between the first and second words indicates a strength of the semantic relationship between the first and second words.

5. The apparatus of claim 1, the memory comprising instructions that when executed by the processor cause the processor to select, using the causal inference structure, words in a message generated in response to user input including an observed concept comprising the first word based, at least in part, on a prediction as to which cause concepts caused the observed concept, wherein at least one of the cause concepts comprises the second word.

6. The apparatus of claim 1, wherein at least a portion of the textual input data is unlabeled.

7. The apparatus of claim 1, the memory comprising instructions that when executed by the processor cause the processor to:
identify the first word and the second word in user input; and
output a prediction based on the causal inference structure, the prediction to indicate the second word contributes to a context associated with the first word.

8. The apparatus of claim 1, wherein the causal inference structure comprises a causal graph.

9. A non-transitory computer-readable medium storing instructions that, when executed by one or more processors, cause the one or more processors to:
analyze textual input data to determine a causal relationship between a first word in the textual input data and a second word in the textual input data based on semantics of the textual input data, wherein determining the causal relationship comprises mapping the first word to a first concept using an unsupervised artificial neural network by learning a first vector representation for the first word; mapping the second word to a second concept using the unsupervised artificial neural network by learning a second vector representation for the second word; generating a hypothesis comprising the first concept and the second concept, the hypothesis representing a prediction that the first concept is dependent upon the second concept; defining a probability distribution describing a likelihood of observing the first concept given the second concept; and assigning a coefficient to the second concept based on an amount of contribution of the second concept to the first concept, the coefficient for the second concept comprising a vector in a semantic space;

determine a weight for a connection in a causal inference structure, the connection between the first and second words in the textual input data based on the causal relationship determined between the first and second words; and generate the causal inference structure comprising the first word, the second word, and the connection with the weight between the first and second words.

10. The non-transitory computer-readable medium of claim 9, comprising instructions that, when executed by the one or more processors, cause the one or more processors to identify a semantic relationship between the first and second words in the textual input data to determine the causal relationship between the first and second words.

11. The non-transitory computer-readable medium of claim 10, wherein the semantic relationship comprises a frequency with which the first and second words are present in a same sentence of the textual input data.

12. The non-transitory computer-readable medium of claim 10, wherein the weight of the connection between the first and second words indicates a strength of the semantic relationship between the first and second words.

13. The non-transitory computer-readable medium of claim 9, comprising instructions that, when executed by the one or more processors, cause the one or more processors to select, using the causal inference structure, words in a message generated in response to user input including an observed concept comprising the first word based, at least in part, on a prediction as to which cause concepts caused the observed concept, wherein at least one of the cause concepts comprises the second word.

14. The non-transitory computer-readable medium of claim 9, wherein at least a portion of the textual input data is unlabeled.

15. The non-transitory computer-readable medium of claim 9, comprising instructions that, when executed by the one or more processors, cause the one or more processors to:
identify the first word and the second word in user input; and
output a prediction based on the causal inference structure, the prediction to indicate the second word contributes to a context associated with the first word.

16. The non-transitory computer-readable medium of claim 9, wherein the causal inference structure comprises a causal graph.

17. A computer-implemented method, comprising:
analyzing textual input data to determine a causal relationship between a first word in the textual input data and a second word in the textual input data based on semantics of the textual input data, wherein determining the causal relationship comprises mapping the first word to a first concept using an unsupervised artificial neural network by learning a first vector representation for the first word; mapping the second word to a second concept using the unsupervised artificial neural network by learning a second vector representation for the second word; generating a hypothesis comprising the first concept and the second concept, the hypothesis representing a prediction that the first concept is dependent upon the second concept; defining a probability distribution describing a likelihood of observing the first concept given the second concept; and assigning a coefficient to the second concept based on an amount of contribution of the second concept to the first concept, the coefficient for the second concept comprising a vector in a semantic space;

determining a weight for a connection in a causal inference structure, the connection between the first and second words in the textual input data based on the causal relationship determined between the first and second words; and generating the causal inference structure comprising the first word, the second word, and the connection with the weight between the first and second words.

18. The computer-implemented method of claim 17, comprising identifying a semantic relationship between the first and second words in the textual input data to determine the causal relationship between the first and second words.

19. The computer-implemented method of claim 17, comprising selecting, using the causal inference structure, words in a message generated in response to user input including an observed concept comprising the first word based, at least in part, on a prediction as to which cause concepts caused the observed concept, wherein at least one of the cause concepts comprises the second word.

20. The computer-implemented method of claim 17, comprising:

identifying the first word and the second word in user input; and outputting a prediction based on the causal inference structure, the prediction indicating the second word contributes to a context associated with the first word.

* * * * *